A. A. WEIGEL.
ANTIFRICTION BEARING.
APPLICATION FILED APR. 2, 1914.
1,168,357.
Patented Jan. 18, 1916.
2 SHEETS—SHEET 1.
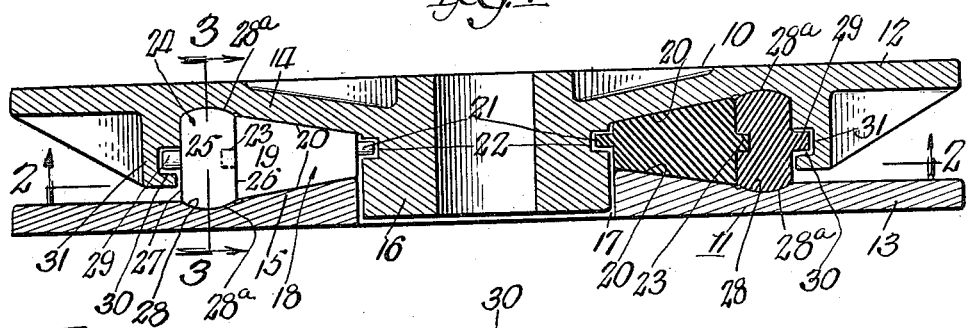
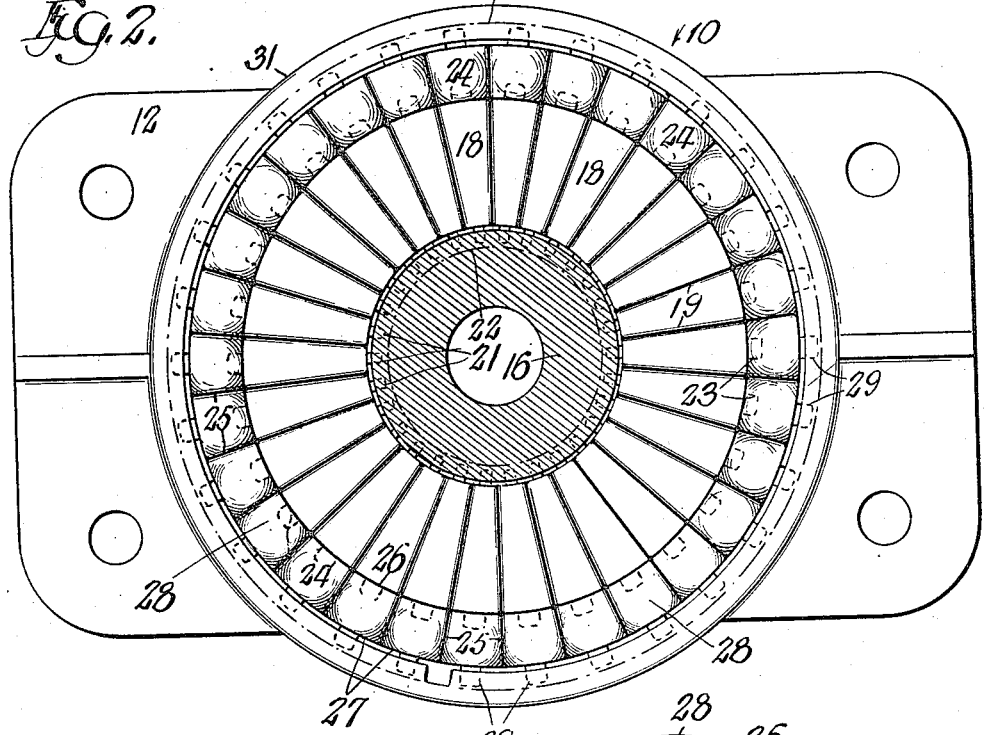
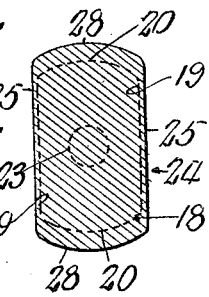
Witnesses:
T. K. Alfred
N. W. Doll
Inventor
Arnold A. Weigel
by Brown & Uhlhorn Attys A. A. WEIGEL.
ANTIFRICTION BEARING.
APPLICATION FILED APR. 2, 1914.
1,168,357.
Patented Jan. 18, 1916.
2 SHEETS—SHEET 2.
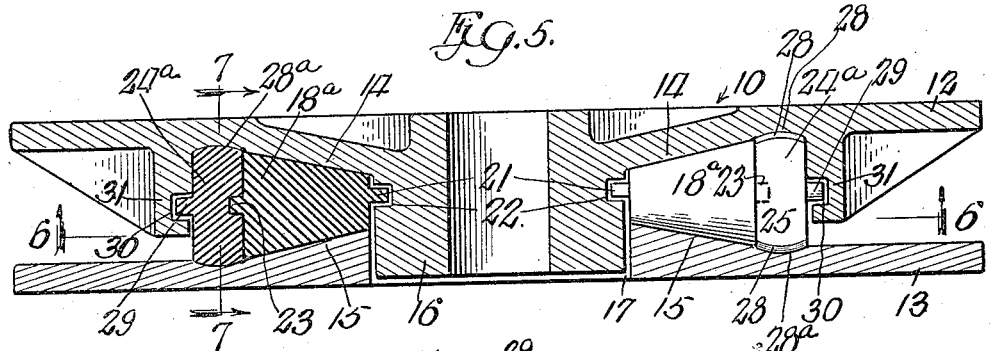
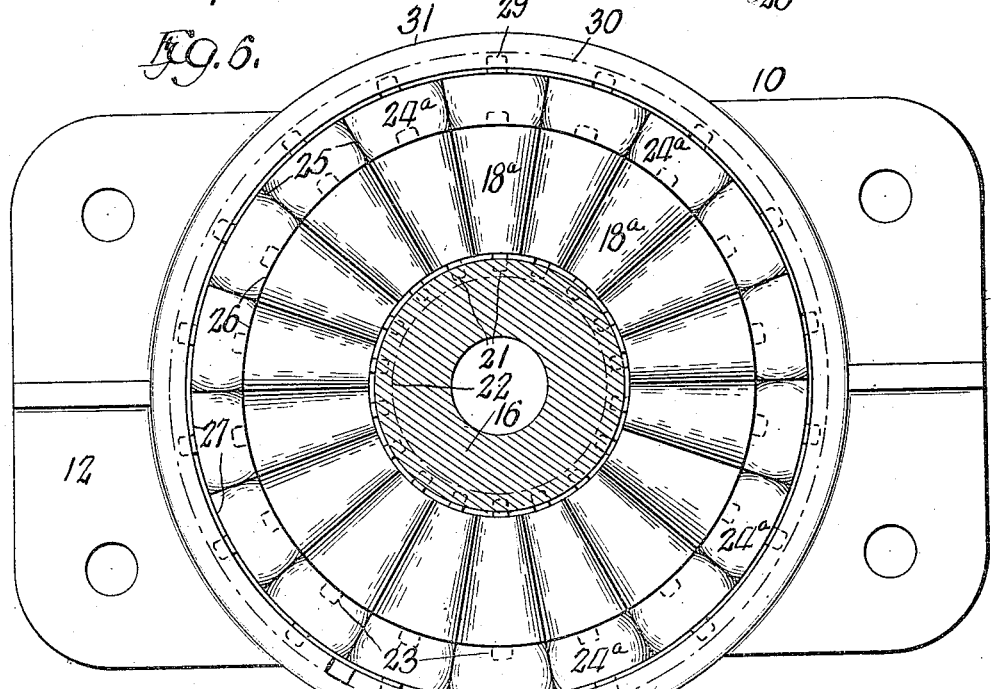
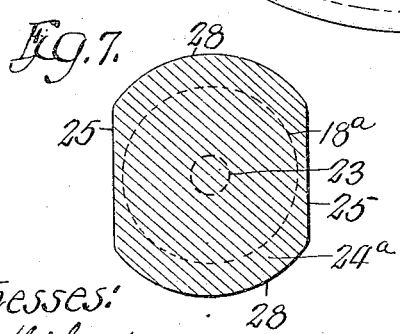
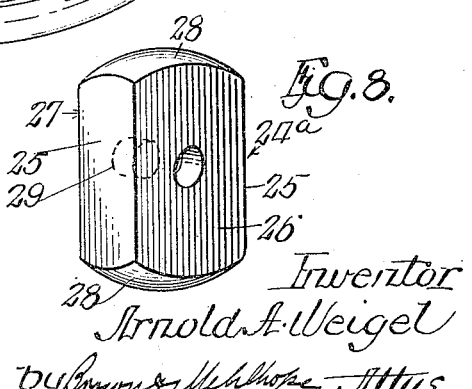
Inventor
Arnold A. Weigel

UNITED STATES PATENT OFFICE.

ARNOLD A. WEIGEL, OF CHICAGO, ILLINOIS, ASSIGNOR TO ALBERT G. WELCH, OF CHICAGO, ILLINOIS, TRUSTEE OF EDWIN S. WOODS, DECEASED.

ANTIFRICTION-BEARING.

1,168,357.   Specification of Letters Patent.   Patented Jan. 18, 1916.

Application filed April 2, 1914. Serial No. 828,952.

*To all whom it may concern:*

Be it known that I, ARNOLD A. WEIGEL, a citizen of the United States, and a resident of Chicago, in the county of Cook and State of Illinois, have invented certain new and useful Improvements in Antifriction-Bearings; and I do hereby declare that the following is a full, clear, and exact description thereof, reference being had to the accompanying drawings, and to the letters of reference marked thereon, which form a part of this specification.

This invention relates to improvements in antifriction bearings and particularly to antifriction bearings adapted for use as center bearings interposed between the truck and body bolster of a railway car and in analogous situations.

As shown and described herein the improvement is applied to use in connection with a center-bearing for railroad cars, but it will be understood that the invention is not limited thereto, but is capable of use generally wherever a center bearing of the kind described is used.

The center bearing illustrated is of the general type described in the patent heretofore granted on the 20th day of June 1911, to Edwin S. Woods, No. 995,835, entitled "Antifriction center bearing," but the improvement to which the present application relates is applicable to other types of center bearing, as will appear more fully as I proceed with my specification.

The invention consists of the matters hereinafter described and more particularly pointed out in the appended claims.

In the drawings: Figure 1 is a view representing a vertical central section through a center bearing of the kind described provided with my improvement. Fig. 2 is a view representing a horizontal section through Fig. 1 in a plane indicated by the line 2—2 of Fig. 1 and looked at from below as indicated by the arrows. Fig. 3 is a view representing a partial vertical section through Fig. 1 in a plane indicated by the line 3—3 of Fig. 1. Fig. 4 is a perspective view of the member shown in transverse section in Fig. 3. Fig. 5 is a view representing a vertical central section through a center bearing provided with a different type of antifriction element from that shown in Figs. 1 and 2. Fig. 6 is a view representing a horizontal section through Fig. 5 as looked at from below in the direction of the arrows. Fig. 7 is a view representing a partial section through Fig. 5 in the plane indicated by the line 7—7 of Fig. 5. Fig. 8 is a perspective view of the member shown in Fig. 7.

Referring now to that embodiment of my invention shown in the drawings, and particularly in Figs. 1 to 4, thereof, 10 indicates the upper member and 11 the lower member of a car center bearing, these parts being preferably made as usual of cast metal. Said upper and lower bearing members are provided with apertured marginal flanges 12 and 13 and are adapted to be secured to the body and truck bolsters, (not shown) by bolts or rivets extending through the apertures in said flanges. The said members are shaped to form between them a chamber to receive interposed antifriction bearing elements through the medium of which the load is transmitted from the upper to the lower bearing member. Said chamber is annular and the upper and lower walls thereof, formed on the lower surface of the upper member and on the upper surface of the lower member, respectively, constitute bearing surfaces 14 and 15 with which the upper and lower bearing faces of the antifriction element have rolling contact or engagement. The upper member 12 is provided with an annular boss or hub 16 which engages within a central opening 17 in the lower member and the said boss itself is provided with an annular hole or opening to receive the usual king-bolt that connects the body bolster with the truck bolster. 18 indicates a plurality of antifriction elements arranged annularly in closely spaced relation between the upper and lower bearing members 10 and 11 with their longitudinal axes arranged radially to the vertical central axis of the antifriction bearing. Said antifriction elements are of the general type disclosed in the patent to Edwin S. Woods herein above referred to and consists of conical segments having flattened sides 19, 19 and upper and lower conical bearing surfaces 20, 20 which are rounded transversely and taper toward the center of the bearing. The conical bearing surfaces 20, 20 have rolling engagement with the upper and lower bearing members respectively, and are provided at their inner ends with trunnions 21 for engagement in an annular recess 22 formed in the boss or hub 16 of the upper bearing member for retaining them in assembled relation within the part of the annular chamber formed in said upper bearing member when the lower bearing member is removed. The outer ends of said antifriction elements are likewise supported by means of trunnions 23 which have supporting engagement with other parts of the bearing now to be described.

In an antifriction bearing of the kind above described there is a considerable end thrust of each of the antifriction elements in a direction radial to the center of the bearing, said end thrust being due to the conical formation of the bearing surfaces.

The object of the present invention is to provide a simple and economical construction adapted not only to withstand this end thrust, but in addition to provide an antifriction device capable of greatly reducing the friction which has heretofore existed in this type of center bearing opposing the intended rocking movement of the antifriction element and due to the member in the bearing, which is intended to resist the said end thrust.

In carrying out my invention I provide a plurality of antifriction end thrust members, one for each antifriction element 18, each end thrust element being placed in radial axial alinement with its associated antifriction element of the main bearing. 24 indicates said elements. Each element 24 consists of a segment of a ball or sphere having a radius somewhat greater than the radius of the bearing surfaces of the antifriction element 18 at its outer or larger end. Said ball segment has flat sides 25, 25 formed in substantially the radial planes of the sides of the associated antifriction elements 18 and has substantially flat inner and outer faces 26, 27. 28, 28 indicate the spherical bearing surfaces of said end thrust member and the bearing members 10 and 11 are provided with annular grooves 28ª, 28ª which are rounded in transverse section to fit the spherical bearing surfaces of the antifriction thrust members.

The inner face 26 of the antifriction element is provided at its center with a recess to receive the trunnion 23 at the outer end of its associated antifriction element 18, while the outer face 27 of said member has a trunnion 29 which engages in an annular recess 30 formed on a depending flange 31 that defines the outer limits of that part of the antifriction chamber provided in the upper bearing member. Thus the outer end of the antifriction element 18 is supported by its associated antifriction thrust member 24, and said thrust member by the flange 31 of the upper bearing member when the lower bearing member is removed.

The operation of my improved antifriction bearing is as follows: Load is transmitted between the upper and lower bearing members not only by the antifriction elements 18 but also by the spherical end thrust members 24. Preferably the parts are so designed that about one-third of the load is transmitted through the said end thrust members. As said end thrust members 24 have spherical bearing surfaces, they have no end thrust themselves so that no means is required to compensate for their end thrust, said end thrust members rocking on their axes radial to the center of the antifriction bearing without friction against the outer wall of the confining chamber. Said end thrust members, however, on account of the load transmitted to them, do offer a proportional resistance, due to friction, to movement between the bearing members in a direction radial to the center of the antifriction bearing. They are thus capable of withstanding the end thrust of their associated antifriction element. At the same time as they rock on axes which are in radial alinement with the axes on which their associated antifriction elements rock in the oscillation of the bearing members on their axes, each end thrust member rocks with and to a like angle and at the same time with its associated antifriction element so that there is no relative movement between the outer end of the antifriction element and the inner face of the associated end thrust member. The end thrust member thus acts not only to resist the radial outward thrust of the antifriction element, but also obviates and prevents any friction tending to oppose the rocking movement of said antifriction element due to said end thrust.

In Figs. 5 to 8, inclusive, I have shown a modified form of my invention in which like parts are indicated by the same reference numerals as heretofore used. The construction in the said figures is the same as that shown in Figs. 1 to 4, inclusive, except that in this case the antifriction elements are full cones, instead of conical segments with flattened sides as in the other case, and the end thrust members are correspondingly larger segments of spheres in a horizontal direction. In this case, 18ª indicates the antifriction elements, which as shown are full cones and 24ª indicates the end thrust members. The other parts of the bearing are the same and the operation and results are like those above described.

While in describing my invention I have referred to certain details of construction and arrangement, it is to be understood that the invention is not limited thereto except as may be pointed out in the appended claims.

I claim as my invention:

1. In a center bearing of the kind described, in combination with a radially disposed antifriction element adapted to transmit a part of the load, an antifriction end thrust member for said antifriction element adapted to transmit the balance of the load, said antifriction end thrust member being in coaxial alinement with said antifriction element.

2. In a center bearing comprising upper and lower bearing members, a plurality of interposed, annularly arranged, radially disposed antifriction elements, said antifriction elements being adapted to transmit a part of the load between said bearing members, and a plurality of annularly disposed antifriction end thrust members for said antifriction elements adapted to transmit the balance of the load between said bearing members, said antifriction end thrust members being in coaxial alinement with said antifriction elements.

3. In a center bearing of the kind described, in combination with a radially disposed antifriction element adapted to transmit a part of the load, an antifriction end thrust member adapted to transmit the balance of the load, said end thrust member having a surface engaging with said antifriction element which is substantially equal to the area of the thrust end of the antifriction element, said antifriction end thrust member being in coaxial alinement with said antifriction element.

4. In a center bearing comprising upper and lower bearing members and a plurality of interposed annularly arranged, radially disposed antifriction elements adapted to transmit load between said bearing members, and a plurality of annularly disposed end thrust members, placed one at the end of and coaxial with each of said antifriction elements, each end thrust member having upper and lower spherical bearing surfaces adapted for engagement with said bearing members, and to transmit a part of the load between said bearing members, each end thrust member being constructed to engage and oscillate with an associated antifriction element.

5. In a center bearing comprising upper and lower bearing members and a plurality of interposed annularly arranged, radially disposed antifriction elements adapted to transmit load between said bearing members, a plurality of annularly disposed end thrust members, placed one at the outer end of and coaxial with each of said antifriction elements, each end thrust member having upper and lower spherical bearing surfaces adapted for engagement with said bearing members, and to transmit load between said bearing members, each end thrust member being constructed to engage and oscillate with an associated antifriction element, and means for supporting said end thrust members and said antifriction members in one of said bearing members.

6. In a center bearing comprising upper and lower bearing members and a plurality of interposed, annularly arranged, radially disposed antifriction elements adapted to transmit load between said bearing members, a plurality of annularly disposed end thrust members, placed one at the outer end of and coaxial with each of said antifriction elements, each end thrust member having upper and lower spherical bearing surfaces adapted for engagement with said bearing members, and to transmit load between said bearing members, each end thrust member being constructed to engage and oscillate with an associated antifriction element, and means for supporting said end thrust members and said antifriction elements in said upper bearing member when said lower bearing member is withdrawn.

7. In a center bearing comprising upper and lower bearing members and a plurality of interposed, annularly arranged, radially disposed antifriction elements adapted to transmit load between said bearing members, a plurality of annularly disposed end thrust members, placed one at the outer end of and coaxial with each of said antifriction elements, each end thrust member having upper and lower spherical bearing surfaces adapted for engagement with said bearing members, and to transmit load between said bearing members, each end thrust member being constructed to engage and oscillate with an associated element, and means for supporting said end thrust members and said antifriction elements in said upper bearing member when said lower bearing member is withdrawn, said means comprising inwardly and outwardly facing annular shoulders, formed on said upper bearing member, each antifriction element being provided with trunnions on their inner and outer ends, each end thrust member being recessed at its inner end and provided with a trunnion on its outer end, the trunnion on the inner end of said antifriction element being adapted for engagement with said outwardly facing annular shoulder, the trunnion on the outer end of said antifriction element being adapted for engagement within the recess formed in the inner face of said end thrust member, and the trunnion formed on the outer end of said end thrust member being adapted for engagement with said inwardly facing annular shoulder.

In testimony, that I claim the foregoing as my invention I affix my signature in the presence of two witnesses, this 24th day of March, A. D. 1914.

ARNOLD A. WEIGEL.

Witnesses:
GEORGE R. WILKINS,
T. H. ALFREDS.

Copies of this patent may be obtained for five cents each, by addressing the "Commissioner of Patents, Washington, D. C."